UNITED STATES PATENT OFFICE.

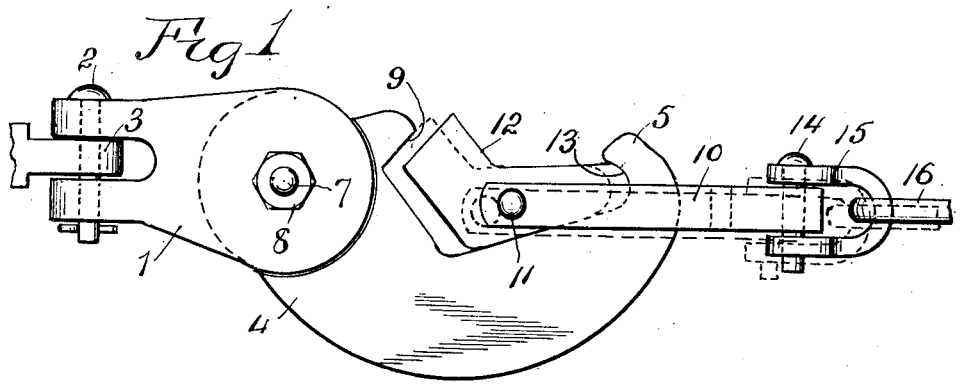
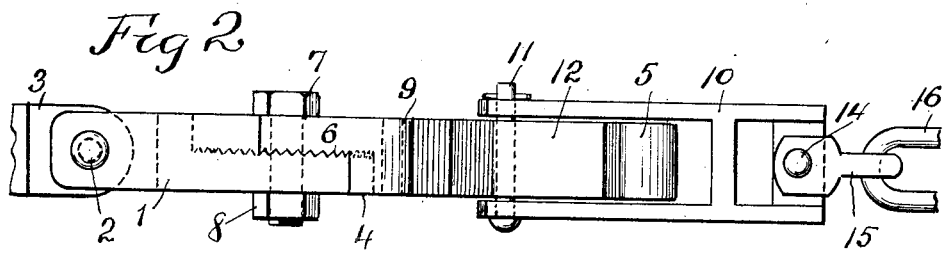
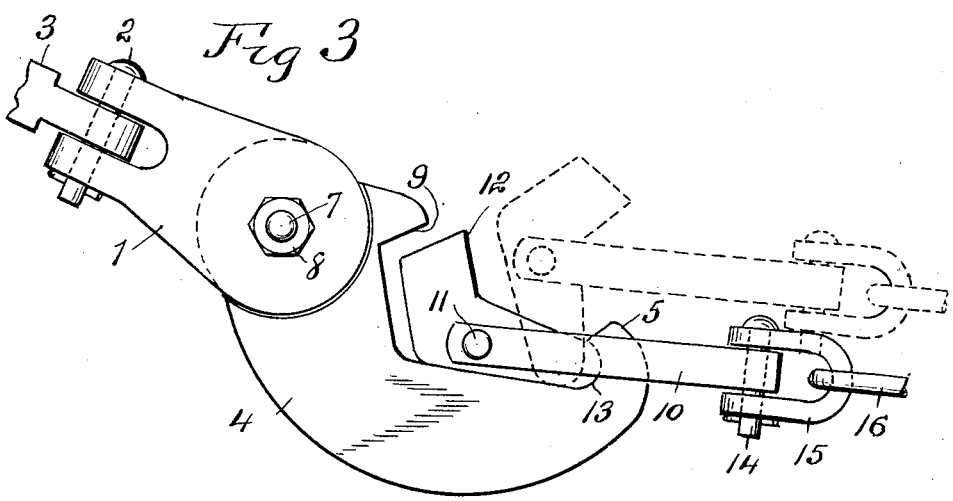

FRED A. SIEVERLING, OF GREAT BEND, KANSAS.

TRACTOR-HITCH.

1,370,850.  Specification of Letters Patent.  Patented Mar. 8, 1921.

Application filed January 5, 1921. Serial No. 435,231.

*To all whom it may concern:*

Be it known that I, FRED A. SIEVERLING, a citizen of the United States, residing at Great Bend, in the county of Barton and State of Kansas, have invented a certain new and useful Improvement in Tractor-Hitches, of which the following is a specification.

My invention relates to improvements in tractor hitches.

The object of my invention is to provide a novel hitch by which a tractor can be connected to a plow so as to be automatically released therefrom when the plow encounters an obstruction such as would tilt the tractor rearwardly, thus eliminating danger of overturning the tractor.

A further object of my invention is to provide a tractor hitch of the kind described, which will permit backing of the tractor without effecting the release of the hitch.

My invention provides further a tractor hitch which is simple, cheaply made, strong, durable, not liable to get out of order and which affords a safe connection between the tractor and the plow or other device which is drawn by the tractor.

The novel features of my invention are hereinafter fully described and claimed.

In the accompanying drawing, which illustrates the preferred embodiment of my invention, Figure 1 is a side elevation of my improved tractor hitch, shown in solid lines in the normal draft position, and in dotted lines in the backup position.

Fig. 2 is a top view of the hitch.

Fig. 3 is a side elevation of the hitch showing the hitch device tilted and the locking member being released.

Similar reference characters designate similar parts in the different views.

The hitch is provided with two draft devices adapted to be respectively attached to a tractor and to a plow or other device which it is desired to have drawn by the tractor.

One of these draft devices comprises the following described parts, 1 designates a draft member which is pivoted by a vertical bolt 2 to a draw bar 3 of a tractor.

4 designates another draft member having at its rear end a hook 5 and arranged for circumferential adjustment with respect to the member 1. One side of the member 4 is provided with a roughened surface 6 adapted to engage in a locking manner a similar roughened surface on the adjacent side of the member 1. Extending through the members 1 and 4 is a horizontal bolt 7 the head of which is adapted to bear against the member 4. On the bolt 7 is a nut 8 which bears against the member 1. By tightening the nut 8, the member 4 is held interlocked with the member 1 in the position to which the member 4 has been adjusted. By loosening the nut 8 sufficiently, the member 4 can be swung on the bolt 7 to a desired position and then locked in such position by tightening the nut 8.

The draft device just described is provided on its upper side, preferably, on the member 4 with an abutment or shoulder 9.

The other draft device, which is adapted to be attached to a plow, comprises, preferably, a draft member 10 having two forwardly extending arms disposed respectively at opposite sides of the member 4 and having mounted in them a horizontal bolt 11 on which is movably mounted, preferably, pivotally, a locking member 12 having a rounded rear end arranged to be pivotally mounted in an arcuate recess 13 in the forward side of the hook 5.

In the rear portion of the draft member 10 is mounted a vertical bolt 14 which is mounted in a clevis 15 which is attached to an eye 16 provided on the front end of a plow beam, not shown.

When the parts are in the normal draft position, shown in Fig. 2, and in solid lines in Fig. 1, the line of draft connecting the bolt 11 and the eye 16 is below the pivotal point of engagement of the locking member 12 with the hook 5. In this position the draft on the locking member 12 by the plow draws the locking member downwardly tightly against the member 4 and against the seat of the locking member in the recess 13.

In case that the plow strikes an obstruction which offers enough resistance to tilt the tractor rearwardly, so that the hook member 4 will be in the position shown in Fig. 3, the line of draft will be above the seat or recess 13, and the pull of the plow will swing the locking member 12 upwardly out of locked engagement with the hook 5, thus releasing the tractor when the latter is at an angle less than that at which the tractor will upset. As soon as the locking member 12 is released from the hook, the tractor will drop back to its normal position. The plow may then be released from the obstruction and again coupled to the tractor.

In case that the operator by inadvertence or ignorance should, in making the coupling, reverse the ends of the locking member 12, the latter will not lockingly engage the hook 5, but the pull of the plow will at once swing the locking member to the release position.

In order that the tractor may be backed without releasing the locking member 12, there is provided the abutment 9 arranged to receive the thrust of the locking member 12 in a manner such that the locking member will be retained in a position such that the tractor may force rearwardly the draft member 10 and the device to which this draft member is connected. The abutment 9 becomes useful, when the tractor is hitched to a wagon and is going down hill, or if it is desired to back the wagon. When the tractor again starts forwardly, the locking member 12 will again lockingly engage the hook 5.

I do not limit my invention to the structure shown and described, as many modifications, within the scope of the appended claims, may be made without departing from the spirit of my invention.

What I claim is—

1. In a tractor hitch, two draft devices adapted to be respectively attached to a plow and a tractor, one of said devices comprising two members having means for circumferential adjustment one on the other, one of said members having a hook, and a locking member pivoted to the other device and adapted to have locked engagement with the hook, when the two devices are in the normal operative position and arranged so as to be released from the hook by draft exerted thereon, when said devices have been moved relatively to each other to a pre-determined angle, substantially as set forth.

2. In a tractor hitch, two draft devices adapted to be respectively attached to a plow and to a tractor, one of said devices comprising two members having means for circumferential adjustment one on the other and provided with means for releasably locking them in the position in which they may be adjusted, one of said members having a hook, and a locking member pivoted to the other device and having locked engagement with the hook when said devices are in the normal operative position and arranged to be released from the hook by draft exerted thereupon, when said devices have been moved relatively with respect to each other to a predetermined position, substantially as set forth.

3. In a tractor hitch, two draft devices adapted to be respectively attached to a plow and to a tractor, one of said devices comprising two members having means for being interlocked with each other in different positions, and means including a bolt on which one of said members is adapted to swing for releasably clamping the two members in interlocked engagement with each other, one of said members having a hook, and a locking member pivoted to the other device and having locked engagement with the hook when said devices are in the normal operative position and arranged to be released from the hook by draft exerted thereupon, when said devices have been moved relatively with respect to each other to a predetermined position, substantially as set forth.

4. In a tractor hitch, two draft devices adapted to be respectively attached to a plow and to a tractor, one of said devices having a hook and an abutment, and a locking member carried by the other device and adapted to have locked engagement with the hook, when the two devices are in the normal draft position and movable on the device which carries it so as to be released from the hook by draft thereon, when said devices have been moved relatively to each other to a predetermined position, the locking member being adapted to operatively engage said abutment so as to have locked engagement therewith, when the two devices are forced toward each other, substantially as set forth.

5. In a tractor hitch, two draft devices adapted to be respectively attached to a plow and to a tractor, one of said devices comprising two members having means for circumferential adjustment one on the other, one of said members having a hook and abutment, and a locking member movably mounted on the other device and adapted to have locked engagement with the hook when the two devices are in normal draft position and arranged to be released by draft from the hook, when said devices have been moved relatively to each other to a predetermined position, the locking member being adapted to operatively engage said abutment so as to have locked engagement therewith, when the two devices are forced toward each other, substantially as set forth.

In testimony whereof I have signed my name to this specification.

FRED A. SIEVERLING.